US012777387B2

(12) United States Patent
Selvaganapathy et al.

(10) Patent No.: US 12,777,387 B2
(45) Date of Patent: Oct. 27, 2026

(54) CONFIGURATION SWITCH FOR LOWER LAYER TRIGGERED MOBILITY

(71) Applicant: Nokia Technologies Oy, Espoo (FI)

(72) Inventors: Srinivasan Selvaganapathy, Bangalore (IN); Sanjay Goyal, Murray Hill, NJ (US); Panagiotis Spapis, Munich (DE); Umur Karabulut, Munich (DE)

(73) Assignee: Nokia Technologies Oy, Espoo (FI)

( * ) Notice: Subject to any disclaimer, the term of this patent is extended or adjusted under 35 U.S.C. 154(b) by 272 days.

(21) Appl. No.: 18/776,067

(22) Filed: Jul. 17, 2024

(65) Prior Publication Data

US 2025/0056355 A1 Feb. 13, 2025

(30) Foreign Application Priority Data

Aug. 10, 2023 (IN) ............................ 202341053792

(51) Int. Cl.
*H04W 36/08* (2009.01)
*H04L 5/00* (2006.01)
*H04W 76/20* (2018.01)

(52) U.S. Cl.
CPC ......... *H04W 36/085* (2023.05); *H04L 5/0051* (2013.01); *H04W 76/20* (2018.02)

(58) Field of Classification Search
CPC .. H04L 5/005; H04L 5/0051; H04W 36/0055; H04W 36/0058; H04W 36/0069; H04W 36/0077; H04W 36/0079; H04W 36/00838; H04W 36/08; H04W 36/085; H04W 36/305; H04W 36/362; H04W 72/044; H04W 72/046; H04W 72/231; H04W 76/20
See application file for complete search history.

(56) References Cited

U.S. PATENT DOCUMENTS

2023/0130286 A1* 4/2023 Leng ................ H04W 36/0058 370/331
2023/0388871 A1* 11/2023 Guo .................. H04W 36/0069
(Continued)

FOREIGN PATENT DOCUMENTS

WO 2024/068212 A1 4/2024

OTHER PUBLICATIONS

Nokia, Nokia Shanghai Bell, Remaining Issues on Layer-1 Enhancements for L1/L2-triggered Mobility, 3GPP TSG RAN WG1 #114-bis, Xiamen, P.R. China, R1-2309733, 8 pages, Oct. 9-13, 2023.*
(Continued)

*Primary Examiner* — Frank Duong
(74) *Attorney, Agent, or Firm* — Barta Jones, PLLC

(57) ABSTRACT

Embodiments of the present disclosure relate to lower layer triggered mobility. In an aspect, a terminal device receives a radio resource control signaling including a transmission configuration indicator from a first network device. The transmission configuration indicator state is configured for beam-only-switching. The terminal device performs beam-only switching based on the transmission configuration indicator state and a first switching command, then configuration switching based on the first switching command or a second switching command. As such, a solution for enhanced lower layer triggered mobility is provided, thereby reducing the interruption time.

20 Claims, 9 Drawing Sheets

(56) References Cited

U.S. PATENT DOCUMENTS

| | | | | |
|---|---|---|---|---|
| 2024/0155399 | A1* | 5/2024 | Farag | H04W 24/10 |
| 2025/0071648 | A1* | 2/2025 | Hong | H04W 36/0058 |
| 2025/0081052 | A1* | 3/2025 | Chandrashekar | H04W 36/0058 |
| 2025/0168718 | A1* | 5/2025 | Zou | H04B 7/06952 |
| 2025/0358696 | A1* | 11/2025 | Zhang | H04W 36/0055 |
| 2026/0019906 | A1* | 1/2026 | Zhou | H04W 36/085 |

OTHER PUBLICATIONS

"Discussion on Inter-gNB-CU LTM via NG Interface", 3GPP TSG-RAN WG3#123bis, R3-241528, Agenda: 13.2, Nokia, Apr. 15-19, 2024, 5 pages.
"Discussion on LTM when NR-DC is Configured", 3GPP TSG-RAN WG3#123bis, R3-241529, Agenda: 13.2, Nokia, Apr. 15-19, 2024, 2 pages.
"Discussion on Inter-gNB-CU LTM Procedure", 3GPP TSG-RAN WG3#123bis, R3-241527, Agenda: 13.2, Nokia, Apr. 15-19, 2024, 12 pages.
"Revised WID on Further NR mobility enhancements", 3GPP TSG RAN Meeting #98-e, RP-223520, Agenda: 9.3.2.1, MediaTek Inc., Dec. 12-16, 2022, 5 pages.
"Msc-generator", Sourceforge, Retrieved on Aug. 16, 2024, Webpage available at : https://sourceforge.net/projects/msc-generator/.
"On L1 enhancements for inter-cell beam management", 3GPP TSG RAN WG1 #113, R1-2305533, Agenda: 9.10.1, Samsung, May 22-26, 2023, pp. 1-13.
"3rd Generation Partnership Project; Technical Specification Group Radio Access Network; NR; Radio Resource Control (RRC) protocol specification (Release 17)", 3GPP TS 38.331, V17.5.0, Jun. 2023, pp. 1-1328.
"3rd Generation Partnership Project; Technical Specification Group Radio Access Network; NR; Medium Access Control (MAC) protocol specification (Release 17)", 3GPP TS 38.321, V17.5.0, Jun. 2023, pp. 1-253.
"3rd Generation Partnership Project; Technical Specification Group Radio Access Network; NR; Physical layer procedures for control (Release 17)", 3GPP TS 38.213, V17.6.0, Jun. 2023, pp. 1-262.

* cited by examiner

CONFIGURATION SWITCH FOR LOWER LAYER TRIGGERED MOBILITY

FIELD

Various example embodiments relate to the field of communication and in particular, to a terminal device, network devices, methods, apparatuses, and a computer readable storage medium for lower layer triggered mobility.

BACKGROUND

In the communications area, there is a constant evolution ongoing in order to provide efficient and reliable solutions for utilizing wireless communication networks. Each new generation has it owns technical challenges for handling the different situations and processes that are needed to connect and serve devices connected to the wireless network. To meet the demand for wireless data traffic having increased since deployment of 4th generation (4G) communication systems, efforts have been made to develop an improved 5th generation (5G) or pre-5G communication system. The new communication systems can support various types of service applications for terminal devices.

Conventionally, a handover procedure is based on Layer 3 (L3)-mobility, which might result in high latency. Lower layer triggered mobility (LTM) is provided for mobility enhancements so as to further improve mobility robustness and interruption time. During the procedure of the LTM, mobility is triggered by Layer 2 (L2) based on Layer 1 (L1) measurements. However, the quality of communication for the LTM is still desirable to be improved.

SUMMARY

In general, example embodiments of the present disclosure provide a solution for enhanced lower layer triggered mobility.

In a first aspect, there is provided a terminal device. The terminal device includes at least one processor and at least one memory storing instructions that, when executed by the at least one processor, cause the terminal device at least to: receive, from a first network device, a radio resource control (RRC) signaling including (i) a transmission configuration indicator (TCI) state associated with a beam for a target cell provided by a second network device and (ii) a target cell configuration for lower layer triggered switching (LTM), wherein the TCI state is configured for beam-only-switching; perform, based on the TCI state and a first switching command from the second network device, first switching from a beam for a source cell provided by the second network device to the beam for the target cell; and perform, based on the first switching command or a second switching command from the second network device, second switching from a source cell configuration to the target cell configuration.

In a second aspect, there is provided a first network device. The first network device includes at least one processor and at least one memory storing instructions that, when executed by the at least one processor, cause the network device at least to: transmit, to a second network device, a request for lower layer triggered switching (LTM), the request indicating an early beam switching for the LTM and a soft switching reference cell to a target cell provided by the second network device; receive, from the second network device, a response for the LTM, the response including (i) a transmission configuration indicator (TCI) state associated with a beam for the target cell and (ii) a target cell configuration for the LTM, wherein the TCI state is configured for beam-only-switching; and transmit, to a terminal device, a radio resource control (RRC) signaling including the TCI state and the target cell configuration.

In a third aspect, there is provided a second network device. The second network device includes at least one processor and at least one memory storing instructions that, when executed by the at least one processor, cause the network device at least to: receive, from a first network device, a request for lower layer triggered switching (LTM), the request indicating an early beam switching for the LTM and a soft switching reference cell to a target cell provided by the second network device; transmit, to the first network device, a response for the LTM, the response including (i) a transmission configuration indicator (TCI) state associated with a beam for the target cell and (ii) a target cell configuration for the LTM, wherein the TCI state is configured for beam-only-switching; and transmit, to a terminal device, a first switching command for beam switching and a second switching command for configuration switching.

In a fourth aspect, there is provided a method. The method includes receiving, at a terminal device and from a first network device, a radio resource control (RRC) signaling including (i) a transmission configuration indicator (TCI) state associated with a beam for a target cell provided by a second network device and (ii) a target cell configuration for lower layer triggered switching (LTM), wherein the TCI state is configured for beam-only-switching; performing, based on the TCI state and a first switching command from the second network device, first switching from a beam for a source cell provided by the second network device to the beam for the target cell; and performing, based on the first switching command or a second switching command from the second network device, second switching from a source cell configuration to the target cell configuration.

In a fifth aspect, there is provided a method. The method includes transmitting, at a first network device and to a second network device, a request for lower layer triggered switching (LTM), the request indicating an early beam switching for the LTM and a soft switching reference cell to a target cell provided by the second network device; receiving, from the second network device, a response for the LTM, the response including (i) a transmission configuration indicator (TCI) state associated with a beam for the target cell and (ii) a target cell configuration for the LTM, wherein the TCI state is configured for beam-only-switching; and transmitting, to a terminal device, a radio resource control (RRC) signaling including the TCI state and the target cell configuration.

In a sixth aspect, there is provided a method. The method includes receiving, at a second network device and from a first network device, a request for lower layer triggered switching (LTM), the request indicating an early beam switching for the LTM and a soft switching reference cell to a target cell provided by the second network device; transmitting, to the first network device, a response for the LTM, the response including (i) a transmission configuration indicator (TCI) state associated with a beam for the target cell and (ii) a target cell configuration for the LTM, wherein the TCI state is configured for beam-only-switching; and transmitting, to a terminal device, a first switching command for beam switching and a second switching command for configuration switching.

In a seventh aspect, there is provided an apparatus. The apparatus includes means for transmitting, at a first network device and to a second network device, a request for lower layer triggered switching (LTM), the request indicating an early beam switching for the LTM and a soft switching reference cell to a target cell provided by the second network device; means for receiving, from the second network device, a response for the LTM, the response including (i) a transmission configuration indicator (TCI) state associated with a beam for the target cell and (ii) a target cell configuration for the LTM, wherein the TCI state is configured for beam-only-switching; and means for transmitting, to a terminal device, a radio resource control (RRC) signaling including the TCI state and the target cell configuration.

In an eighth aspect, there is provided an apparatus. The apparatus includes means for transmitting, at a first network device and to a second network device, a request for lower layer triggered switching (LTM), the request indicating an early beam switching for the LTM and a soft switching reference cell to a target cell provided by the second network device; means for receiving, from the second network device, a response for the LTM, the response including (i) a transmission configuration indicator (TCI) state associated with a beam for the target cell and (ii) a target cell configuration for the LTM, wherein the TCI state is configured for beam-only-switching; and means for transmitting, to a terminal device, a radio resource control (RRC) signaling including the TCI state and the target cell configuration.

In a ninth aspect, there is provided an apparatus. The apparatus includes means for receiving, at a second network device and from a first network device, a request for lower layer triggered switching (LTM), the request indicating an early beam switching for the LTM and a soft switching reference cell to a target cell provided by the second network device; means for transmitting, to the first network device, a response for the LTM, the response including (i) a transmission configuration indicator (TCI) state associated with a beam for the target cell and (ii) a target cell configuration for the LTM, wherein the TCI state is configured for beam-only-switching; and means for transmitting, to a terminal device, a first switching command for beam switching and a second switching command for configuration switching.

In a tenth aspect, there is provided a non-transitory computer readable medium including program instructions for causing an apparatus to perform at least the method according to any of the above fourth, fifth and sixth aspects.

In an eleventh aspect, there is provided a terminal device. The terminal device includes receiving circuitry configured to receive, from a first network device, a radio resource control (RRC) signaling including (i) a transmission configuration indicator (TCI) state associated with a beam for a target cell provided by a second network device and (ii) a target cell configuration for lower layer triggered switching (LTM), wherein the TCI state is configured for beam-only-switching; performing circuitry configured to perform, based on the TCI state and a first switching command from the second network device, first switching from a beam for a source cell provided by the second network device to the beam for the target cell; and performing circuitry configured to perform, based on the first switching command or a second switching command from the second network device, second switching from a source cell configuration to the target cell configuration.

In a twelfth aspect, there is provided a first network device. The first network device includes transmitting circuitry configured to transmit, to a second network device, a request for lower layer triggered switching (LTM), the request indicating an early beam switching for the LTM and a soft switching reference cell to a target cell provided by the second network device; receiving circuitry configured to receive, from the second network device, a response for the LTM, the response including (i) a transmission configuration indicator (TCI) state associated with a beam for the target cell and (ii) a target cell configuration for the LTM, wherein the TCI state is configured for beam-only-switching; and transmitting circuitry configured to transmit, to a terminal device, a radio resource control (RRC) signaling including the TCI state and the target cell configuration.

In a thirteenth aspect, there is provided a second network device. The second network device includes receiving circuitry configured to receive, from a first network device, a request for lower layer triggered switching (LTM), the request indicating an early beam switching for the LTM and a soft switching reference cell to a target cell provided by the second network device; transmitting circuitry configured to transmit, to the first network device, a response for the LTM, the response including (i) a transmission configuration indicator (TCI) state associated with a beam for the target cell and (ii) a target cell configuration for the LTM, wherein the TCI state is configured for beam-only-switching; and transmitting circuitry configured to transmit, to a terminal device, a first switching command for beam switching and a second switching command for configuration switching.

In a fourteenth aspect, there is provided a computer program including instructions, which, when executed by an apparatus, cause the apparatus at least to perform at least the method according to any one of the above fourth, fifth and sixth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar element.

DETAILED DESCRIPTION

Figure 1:
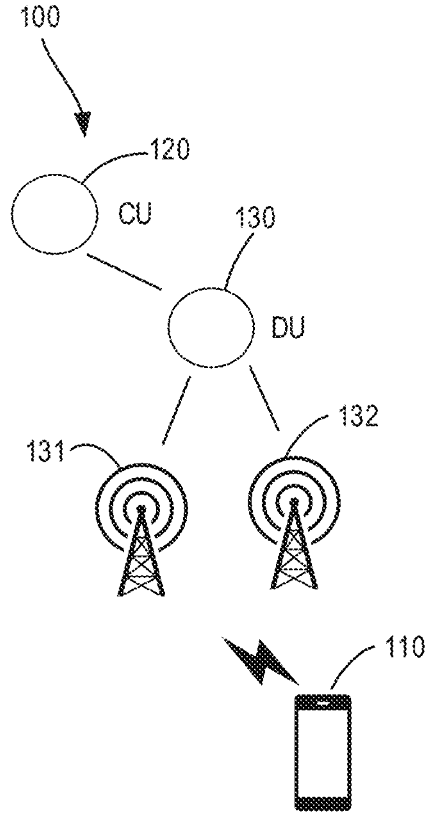
FIG. 1 illustrates an example communication network in which embodiments of the present disclosure may be implemented.

Principles of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a new radio (NR) next generation NodeB (also referred to as a gNB), a Remote Radio Unit (RRU), a radio header (RH), a remote radio head (RRH), a relay, a low power node such as a femto, a pico, and so forth, depending on the applied terminology and technology. An RAN split architecture includes a gNB-CU (Centralized unit, hosting RRC, SDAP and PDCP) controlling a plurality of gNB-DUs (Distributed unit, hosting RLC, MAC and PHY).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, the LTM involves L1 measurements. L1 measurement configurations of all candidate cells can be maintained as common configurations, i.e., external to the ServingCellConfig(s) of current serving cells and external to the configuration of the LTM candidate cells. Configurations of TCI state for the candidate cells can be maintained as common configuration, i.e., external to the ServingCellConfig(s) of current serving cells and external to the configuration of the LTM candidate cells. For L1 measurements of LTM candidate cells, the reporting configuration can be placed inside the ServingCellConfig of current serving cell(s). Target cell configurations are pre-configured via RRC signaling. Switching across prepared cells, also referred as dynamic switching, is possible without reconfiguration. Dynamic switch mechanism among candidate serving cells is applicable for various potential scenarios, such as intra-distributed unit (DU) case and inter-DU case, based on L1/L2 signaling.

In order to enhance the LTM, an inter-cell beam management (ICBM) and LTM co-existence scenario is considered, and the LTM is triggered during the ICBM. An UE will receive a MAC CE trigger cell change command from a non-serving cell as it will be more reliable over the borrowed beam. The MAC CE was triggered by a serving cell DU, and the L1 measurements were relayed from the non-serving cell/DU to the serving cell DU for LTM decision during the ICBM. If the UE is in the ICBM, the CU will receive the L1 measurements and decide to trigger the LTM from serving to non-serving cells. However, the configurations of ICBM and LTM are considered to be separate, and only a regular transition from the ICBM to the LTM is considered, i.e., how to trigger the LTM if the UE is in the ICBM. There is no consideration about any enhancements on the ICBM and LTM configurations for a smooth transition from the ICBM to the LTM.

In addition, partial MAC reset is not supported, and HARQ buffers are released. Pending MAC packets need to be retransmitted from higher layers if supported. Otherwise, there will be some interruption. For the LTM and ICBM interworking, a separate RS configuration is provided for LTM measurements. This may also include current serving cells' intra-cell RS configurations as some of the current serving cells (e.g., secondary cells) may also be LTM candidate cells or/and the measurement from the current SpCell may be configured to report to compare the quality with the LTM candidate cells. If the ICBM is also enabled for the same target cells, there will be redundant measurements and also redundant resource configurations at Target-cell that needs to be explicitly released via a RRC signaling procedure. A TCI state switching for the ICBM and LTM is triggered via different MAC CE commands.

Moreover, for intra-DU LTM switching scenarios, the MAC level reset during the switching should be avoided as the same scheduler is handling both cells. Independent configurations of the LTM and ICBM towards the same target cell is not signaling efficient. Also, UE behavior changes are required to optimize the L1 measurements for the ICBM and LTM purpose. Managing these two measurements and reporting functions for the same target cell at the UE may lead to capability restriction.

With the consideration of the ICBM, a beam of the target cell can be indicated first, then it is followed by a cell switch command. The UE starts communicating with the target cell by using the indicated TCI state before the cell switch command, and the cell switch command is then sent to complete the handover procedure.

Herein, the ICBM enables the beam measurements, and TCI state configuration of the serving cell can be extended with some of beams of a target-cell for intra-frequency and intra-DU scenarios. For the ICBM to work seamlessly, the target cell needs to allocate resources for PDCCH and PUCCH at the same locations of the serving cell so as to allow the UE to simply switch the beam direction and continue to use the same resource configuration when an inter-cell beam switching is triggered. The PUCCH resource allocation for ICBM is needed for regular PUCCH operation and also to continue L1 measurement reporting via same PUCCH resources after the inter-cell beam switching.

According to embodiments of the present disclosure, there is provided a solution to delay configuration switch for lower layer triggered mobility. In this solution, a terminal device can receive a radio resource control (RRC) signaling including a transmission configuration indicator (TCI) from a first network device. The TCI state is configured for beam-only-switching. The terminal device can perform beam-only switching based on the TCI state and a first switching command, then configuration switching based on the first switching command or a second switching command. As such, a solution for enhanced lower layer triggered mobility is provided, thereby reducing the interruption time. Principles and embodiments of the present disclosure will be described in detail below with reference to the accompanying drawings.

FIG. 1 illustrates a schematic diagram of an example communication environment 100 in which some embodiments of the present disclosure can be implemented. The environment 100 may be a part of a communication network and includes a base station. The base station may comprise a CU and one or more DUs. For the purpose of illustration without suggesting any limitations to the present disclosure, one CU and one DU are shown in FIG. 1. It should be noted that the base station may comprise two devices, i.e. a first network device corresponding to the CU and a second network device corresponding to the DU, when the CU and DU can be considered as individual devices.

As shown in FIG. 1, the environment 100 may comprise a UE 110, a CU 120, and a DU 130. The DU 130 is connected to the CU 120. Operations of the DU 130 may be partly controlled by the CU 120. The CU 120 may terminate the F1 interface connected with the DU 130. The DU 130 may terminate the F1 interface connected with the CU 120. The CU 120 may be a logical node hosting at least one of radio resource control (RRC), service data adaption protocol (SDAP) and packet data convergence protocol (PDCP) protocols of the network device.

The DU 130 may be a logical node hosting at least one of radio link control (RLC), medium access control (MAC) and physical (PHY) layers of the network device. The DU 130 may provide or support one or more cells. One cell is supported by only one DU. For example, the DU 130 may provide cells 131 and 132. It is to be understood that the environment 100 may include any suitable number of UEs, CUs and DUs adapted for implementing implementations of the present disclosure.

The communications in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connectivity (DC), and New Radio Unlicensed (NR-U) technologies.

The UE 110 may access one cell provided by the DU 130. For example, the UE 110 may be initially connected to the cell 131 provided by the DU 130. Based on measurements, the UE 110 may perform an intra-DU mobility procedure so as to move from the cell 131 to the cell 132 provided by the DU 130.

Figure 2:
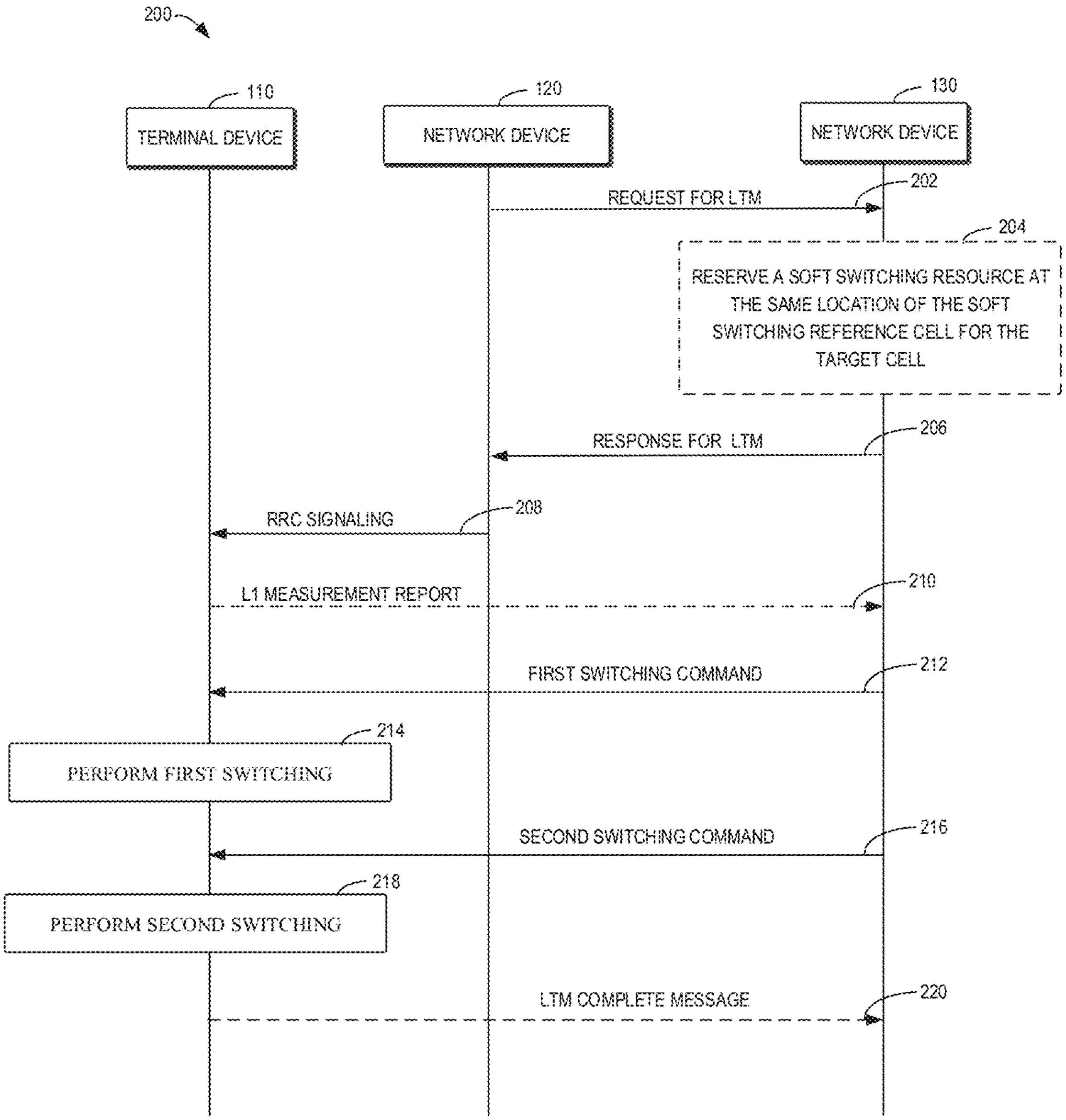
FIG. 2 illustrates a flowchart illustrating a process for lower layer triggered mobility according to some embodiments of the present disclosure.

More details of some embodiments of the present disclosure will be described with reference to FIG. 2. FIG. 2 shows a signaling chart illustrating a process 200 for lower layer triggered mobility according to various embodiments. Only for the purpose of discussion, the process 200 will be described with reference to FIG. 1. The process 200 may involve the UE 110 (corresponding to a terminal device), the CU 120 (corresponding to a first network device), the DU 130 (corresponding to a second network device), the cell 131 (corresponding to a source cell), and the cell 132 (corresponding to a target cell) in FIG. 1. It is to be appreciated that any graphic elements, numerical values, and descriptive text in these figures are only for the purpose of illustration without suggesting any limitations.

In the process 200, the CU 120 transmits (202) a request for lower layer triggered switching (LTM) to the DU 130. The request indicates an early beam switching for the LTM and a soft switching reference cell to a cell 132 provided by the DU 130. In some embodiments, after receiving the request, the DU 130 may reserve (204) a soft switching resource at the same location of the soft switching reference cell (for example, the cell 131) for the cell 132.

At the second first device side, in response to the request, the DU 130 transmits (206) a response for the LTM to the CU 120. The response includes (i) a transmission configuration indicator (TCI) state associated with a beam for the cell 132 and (ii) a target cell configuration for the LTM. The TCI state is configured for beam-only-switching. On the other side of communication, the CU 120 receives the response for the LTM from the DU 130, and transmits (208) a radio resource control (RRC) signaling to the UE 110. The RRC signaling includes the TCI state and the target cell configuration.

At the terminal device side, the UE 110 receives the RRC signaling. In some embodiments, the RRC signaling further includes a reference signal (RS) configuration associated with the beam for the cell 132. After receiving the RRC signaling, the UE 110 may transmit (210) a layer 1 (L1) measurement report generated based on the RS configuration to the DU 130.

On the other side of communication, after receiving the L1 measurement report, the DU 130 transmits (212) the first switching command for beam switching to the UE 110. In some embodiments, the first switching command may be transmitted by the DU 130 based on the L1 measurement report in the case that the cell 132 is in an LTM cell group for soft switching. Information of an LTM cell group may be included in the RRC signaling.

At the terminal device side, after receiving the first switching command, based on the TCI state and the first switching command, the UE 110 perform (214) first switching from a beam for the cell 131 provided by the DU 130 to the beam for the cell 132. The first switching command may include the TCI state. Next, the UE 110 may transmit a beam switching message to the DU 130.

In some embodiments, after performing the first switching, the UE 110 may perform transmission to the DU 130 or reception from the DU 130 using the soft switching resource associated with the beam-only-switching for the LTM. Meanwhile, after receiving the beam switching message, the DU 130 may perform transmission to the UE 110 or reception from the UE 110 using the soft switching resource.

At the second first device side, the DU 130 transmits (216) a second switching command for configuration switching to the UE 110. On the other side of communication, based on the first switching command or the second switching command from the DU 130, the UE 110 perform (218) second switching from a source cell configuration to the target cell configuration. The second switching command may be a LTM switching command without the TCI state. After receiving the LTM switching command without the TCI state, the UE 110 may perform transmission to the DU 130 or reception from the DU 130 using a target cell resource associated with the target cell configuration.

In some embodiments, the first switching command may include a flag indicating delayed configuration switching along with a delay value (for example, an expiry value for a timer). Next, as described above, the UE 110 perform the first switching. In an example, the UE 110 further receive perform the second switching based on expiry of the timer. In another example, the UE 110 further receive the second switching command transmitted by the DU 130 based on completion of the transmission or the reception via the soft switching resource, and perform the second switching.

In some embodiments, prior to receiving the second switching command, the UE 110 may further receive a timer extension command from the DU 130 for delaying the second switching. Alternatively, prior to receiving the second switching command, the UE 110 may further receive a switching deny command from the DU 130 for cancelling the second switching. In addition, after performing the second switching, the UE 110 may further transmit a LTM complete message to the DU 130, and release the soft switching resource.

Figure 3:
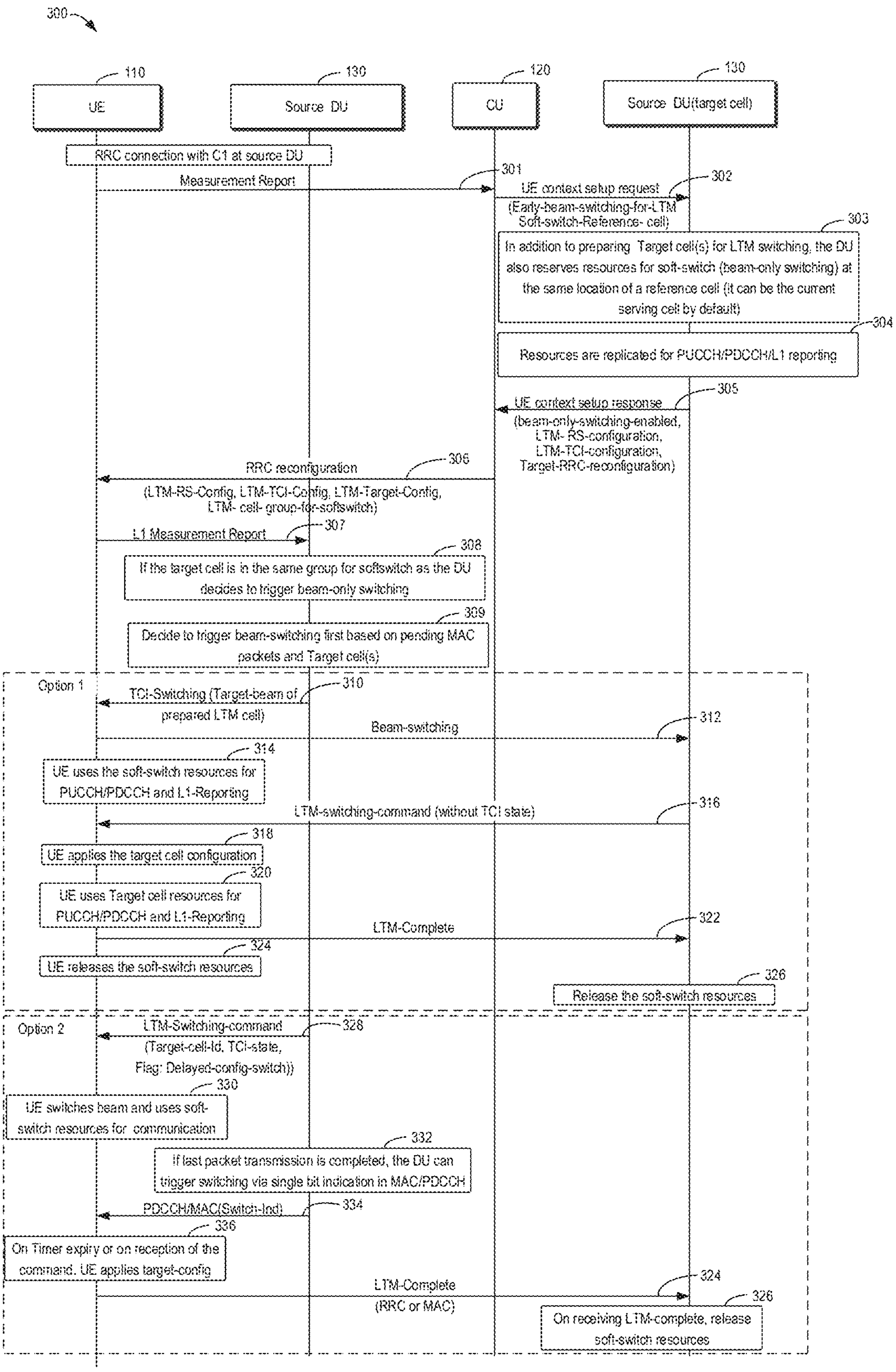
FIG. 3 illustrates a flowchart illustrating a process for lower layer triggered mobility according to some embodiments of the present disclosure.

Now some embodiments of the present disclosure herein will be further described in detail with reference to FIG. 3 below for the purpose of clearer understanding. FIG. 3 illustrates an example of a process 300 for lower layer triggered mobility in accordance with some example embodiments of the present disclosure.

In FIG. 3, an enhanced procedure is proposed for preparing intra-DU LTM target cells enabling beam-only-switching operation prior to the configuration switching. This procedure enables a single preparation process for combined beam switching and LTM-configuration switching towards the same cell. When a target cell supports such operation, i.e., initially beam-only switching and then LTM-configuration switching (i.e., cell switching), a source/serving DU has the flexibility to delay the configuration switching depending on the pending data transmission at Layer 1 (or depending on interruption time requirements). As the pending packets are delivered via beam switching operation without MAC reset, the interruption time due to lower-layer packet loss can be minimized for intra-DU LTM target cells.

More specifically, the UE may establish RRC connection with Cell 1 at source DU, and send (301) a measurement report to the CU. The CU may indicate 'beam-only-switching-support' to the target DU when preparing the target cells for LTM. The CU also includes a serving-cell L1-reporting-configuration. In other words, when preparing the intra-DU target cell for LTM switching, the CU will request for early beam switching in a preparation message. As shown in FIG. 3, the CU sends (302) a UE context setup request to the DU providing the target cell. The request indicates early beam switching for LTM and a soft-switch reference cell to the target cell.

Based on this request, at blocks 303 and 304, in addition to preparing target resources for LTM purpose, the target cell also reserves or replicates resources (PUCCH/PDCCH/L1 reporting resources) for soft-switch (beam-only switching) at the same location of the reference cell (it can be the current serving cell by default) to allow beam switching to work. These resources are referred to as 'soft-switch' resources for seamless beam-only switching. The soft-switch resources will be further illustrated in FIG. 4 below.

If the resource reservation for beam-only switching is possible, the DU can inform beam-only-switching-activated in a response message to the CU, and provides a LTM-RS configuration and a target configuration to be used for switching. As shown in FIG. 3, the DU sends (305) a UE context setup response to the CU. The response may include a beam-only switching enabled indication, a LTM RS configuration, a LTM TCI configuration, and a target RRC reconfiguration.

After the preparation process as described above, a RRC configuration process can be performed. In detail, after receiving the response from the DU, the CU can send (306) a RRC reconfiguration message to the UE. The RRC reconfiguration message includes TCI-states for which beam-only switching is possible. For example, as shown in FIG. 3, the RRC reconfiguration message includes the LTM RS configuration, the LTM TCI configuration, the LTM target configuration, and a LTM cell group for soft-switch. The LTM RS configuration and the LTM TCI state configurations are configured as common configurations. Some of target cells or/and TCI states are marked for beam-only-switching. This means that TCI states of these target cells can be used for beam-only-switching. When these TCI states are indicated alone, the UE can trigger the beam switching. When other TCI states are indicated, the UE may start downlink sync to those target cells only without switching PUCCH/PDCCH resources.

In an example, the RRC reconfiguration message indicates the candidate cells for which beam-only switching is possible. When a TCI state associated with such a candidate cell is indicated, the UE can first trigger the beam switching only for the candidate cell.

After receiving the RRC reconfiguration message, the UE may send (307) a L1 measurement report to the DU. At block 308, if the target cell is in same group for soft switch, the DU may decide to trigger beam-only-switching. At block 309, the DU may decide to trigger beam switching first based on pending MAC packets and the target cell.

Next, there are two options for the subsequent LTM switching execution process. In option 1, the DU may send (310) a TCI switching command indicating a target beam of prepared LTM cell to the UE. In response to the TCI switching command, the UE may perform the beam-only switching. A beam switching message may be transmitted (312) from the UE to the target cell of the DU. At block 314, the UE may use the soft-switch resources for PUCCH/PDCCH/L1 reporting. After performing the beam-only switching, a LTM switching command without TCI state can be received (316) by the UE from the target cell of the DU. In response to the LTM switching command, the UE may apply the target cell configuration at block 318. Further, the UE may use target cell resources for PUCCH/PDCCH/L1 reporting at block 320.

An additional process for maintenance of soft-switch resources can be included in example embodiments of the present disclosure. If the target cell wants to remove the soft-switch resource due to resource constraints, the DU should disable soft-switch for these target cells. This can be indicated via a Layer 2 (a MAC-CE command) or a Layer 1 (a DCI) to disable-soft-switch for a specific set of target-cells. In an example, a LTM complete may be transmitted (322) from the UE to the target cell of the DU. The UE may release (324) the soft-switch resources. Accordingly, the DU may release (326) the soft-switch resources for the target cell.

Alternatively, a common pool of TCI states for LTM is used, including TCI states for beam-only switching or both beam & configuration switching. When a TCI state from the pool is indicated for beam-only switching, an explicit flag for "beam-only switching" can be given along with the TCI state indication. For example, in option 2, the DU may send (328) a LTM switching command to the UE, and the LTM switching command may include a target cell ID, the TCI state, and the flag indicating delayed configuration switching. The flag indicates that the UE should switch the beam first and after the fixed delay. This delay can be explicitly included in the switching command.

In response to the LTM switching command with the TCI state, the UE may switch beam and uses soft-switch resources for communication at block 330. At the DU side, at block 332, if last packet transmission is completed, the DU may trigger switching via single bit indication in MAC/PDCCH. Next, a switch-indication may be transmitted (334) from the DU to the UE via PDCCH/MAC.

Alternatively, instead of indicating a delay value (e.g., a timer expiry value) in the LTM switching command, the DU (or the target cell) can trigger LTM switching via a single bit indication in PDCCH or MAC when the pending transmission is completed before the timer expiry.

At the UE side, at block 336, the UE apply (336) the target cell configuration with timer expiry and reception of the switch-indication. The UE may release (324) the soft-switch resources. Accordingly, the DU may release (326) the soft-switch resources for the target cell.

For the sake of further explanation, more details are given below. In option 1, based on pending packets at MAC level at the time of switching, the DU can decide to send a TCI switching command including the TCI state associated with a beam of the target cell (herein also can be considered as the first switching command) for beam switching. Later an LTM switching command without the beam indication and the TCI state (herein also can be considered as the second switching command) is provided for LTM configuration switching.

As the soft-switch resources (or the PUCCH/PDCCH/L1 reporting resources) for the beam switching operation has been configured in the preparation process so as to enable dynamic activation, when the DU decides to do beam-only switching, the DU can activate the soft-switch resources prior to the beam-only switching.

In option 2, based on pending packets at MAC level at the time of switching, a LTM switching command with TCI state (herein also can be considered as the first switching command) includes an additional flag for delayed configuration switching with a delay value (e.g., a timer expiry value). Such operation can only be enabled for the candidate cells (or TCI states) indicated with “beam-only-switching-support”. In this case, the UE first switches beam only, then applies the target cell configuration and triggers LTM completion after the configured delay.

In addition, after sending the LTM switching command (or the first switching command) with the flag for delayed configuration switching and the delay timer value, a timer extension command (via a DCI or a MAC-CE) may be sent to extend the configuration switching delay. In addition, after sending the LTM switching command with a flag for delayed configuration switching and a delay timer value, a switch deny command (via a DCI or a MAC-CE) may be sent to cancel the LTM switching. In that case, the UE will continue be in the beam switching mode.

Figure 4:
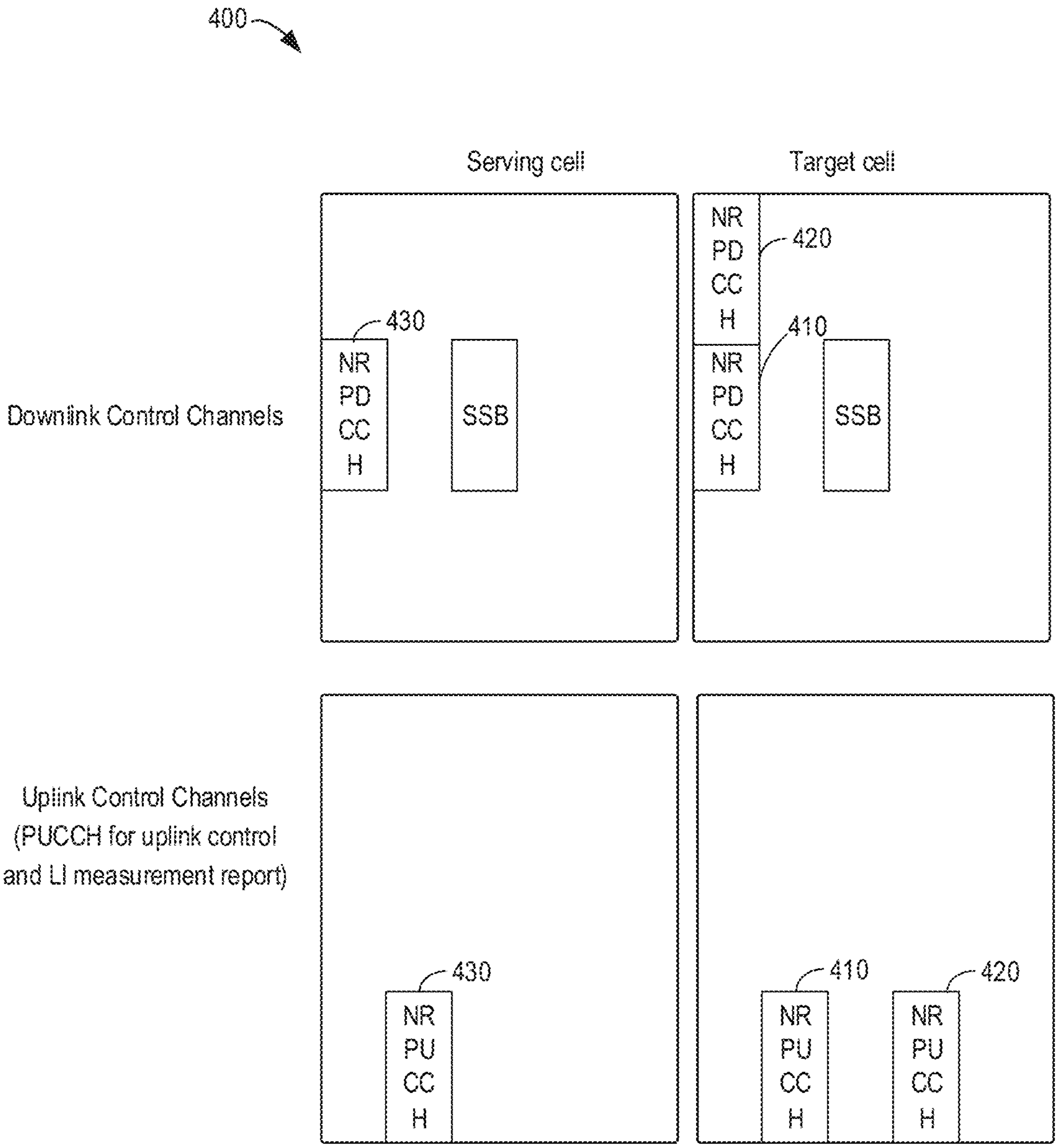
FIG. 4 shows a schematic diagram for resource usage during the LTM switching operation according to some embodiments of the present disclosure.
Figure 5:
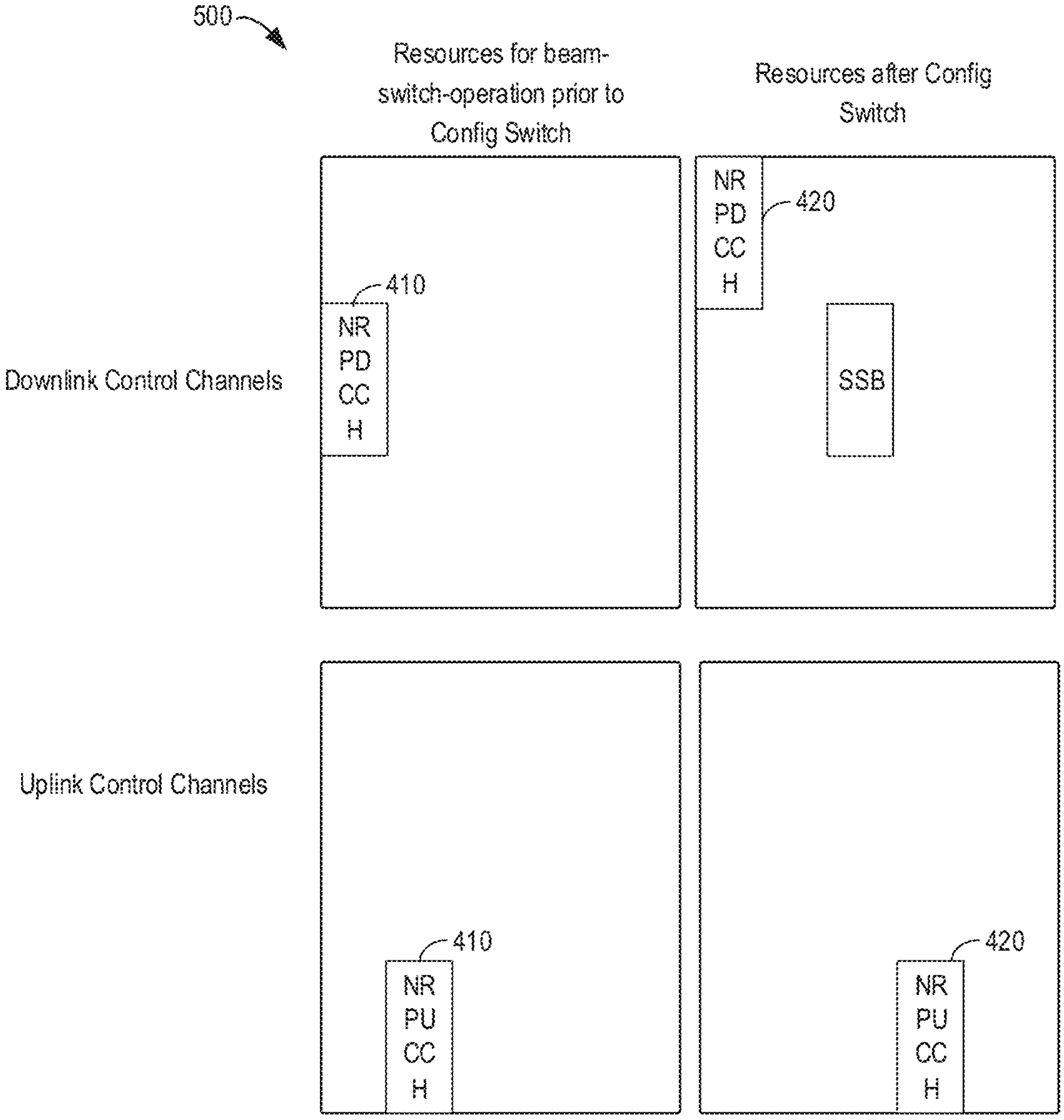
FIG. 5 shows a schematic diagram for resource usage at the target cell during the beam switching operation and after the LTM configuration switching operation according to some embodiments of the present disclosure.

FIG. 4 shows a schematic diagram for resource usage during the LTM switching operation. FIG. 5 shows a schematic diagram for resource usage at the target cell during the beam switching operation and after the LTM configuration switching operation. In FIGS. 4 and 5, two resource locations allocated for the soft-switch operation are given for the target cell. One of the resource locations (corresponding to the soft-switch resources 410 for beam-only switching) can be used for beam switching operation, and the other of the resource locations (corresponding to the target cell resources 420, i.e. resources after the LTM configuration switching) can be used for new serving-cell (i.e. the target cell) operation. The soft-switch resources 410 may be at the same location as source cell resources 430 of the serving cell.

Figure 6:
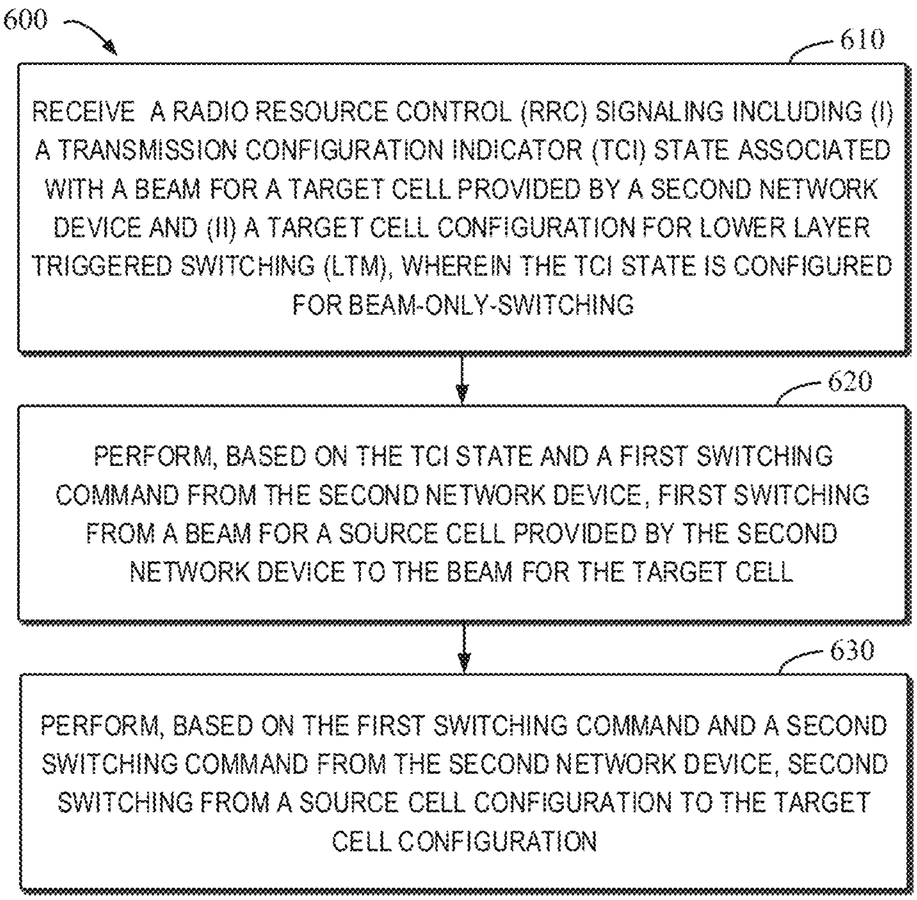
FIG. 6 illustrates a flowchart of a method implemented at a terminal device according to some embodiments of the present disclosure.

FIG. 6 shows a flowchart of an example method 600 implemented at a terminal device in accordance with some embodiments of the present disclosure. For the purpose of discussion, the method 600 will be described from the perspective of the UE 110 with reference to FIG. 1.

At block 610, the UE 110 receives, from a first network device, a radio resource control (RRC) signaling including (i) a transmission configuration indicator (TCI) state associated with a beam for a target cell provided by a second network device and (ii) a target cell configuration for lower layer triggered switching (LTM), wherein the TCI state is configured for beam-only-switching. At block 620, the UE 110 performs, based on the TCI state and a first switching command from the second network device, first switching from a beam for a source cell provided by the second network device to the beam for the target cell. At block 630, the UE 110 performs, based on the first switching command or a second switching command from the second network device, second switching from a source cell configuration to the target cell configuration.

In some embodiments, after performing the first switching, the UE 110 further performs transmission to the second network device or reception from the second network device using a soft switching resource associated with the beam-only-switching for the LTM.

In some embodiments, the RRC signaling further includes a reference signal (RS) configuration associated with the beam for the target cell. After receiving the RRC signaling, the UE 110 further transmits, to the second network device, a layer 1 (L1) measurement report generated based on the RS configuration.

In some embodiments, the RRC signaling further includes information of an LTM cell group for soft switching, and the first switching command is transmitted by the second network device based on the L1 measurement report in the case that the target cell is in the LTM cell group.

In some embodiments, the second switching command is a LTM switching command without the TCI state. After receiving the LTM switching command without the TCI state, the UE 110 further performs transmission to the second network device or reception from the second network device using a target cell resource associated with the target cell configuration.

In some embodiments, the first switching command includes a flag indicating delayed configuration switching along with a delay value.

In some embodiments, the second switching is performed based on expiry of the delay value.

In some embodiments, prior to receiving the second switching command, the UE 110 further receives, from the second network device, a timer extension command for delaying the second switching.

In some embodiments, the second switching command is transmitted by the second network device based on completion of the transmission or the reception via the soft switching resource.

In some embodiments, prior to receiving the second switching command, the UE 110 further receives, from the second network device, a switching deny command for cancelling the second switching.

In some embodiments, after performing the second switching, the UE 110 further transmits a LTM complete message to the second network device, and releases the soft switching resource.

In some embodiments, the first network device is a central unit of a base station. The second network device is a distributed unit of a base station.

Figure 7:
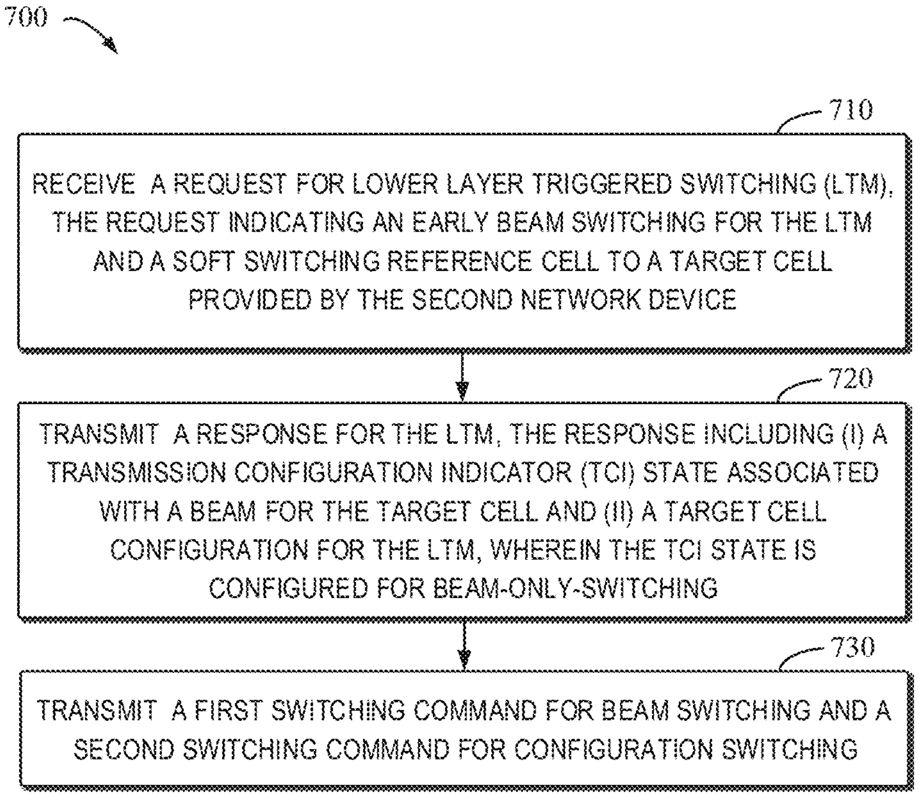
FIG. 7 illustrates a flowchart of a method implemented at a network device according to some embodiments of the present disclosure.

FIG. 7 shows a flowchart of an example method 700 implemented at a second network device in accordance with some embodiments of the present disclosure. For the purpose of discussion, the method 700 will be described from the perspective of the DU 130 with reference to FIG. 1.

At block 710, the DU 130 receives, from a first network device, a request for lower layer triggered switching (LTM), the request indicating an early beam switching for the LTM and a soft switching reference cell to a target cell provided by the second network device. At block 720, the DU 130 transmits, to the first network device, a response for the LTM, the response including (i) a transmission configuration indicator (TCI) state associated with a beam for the target cell and (ii) a target cell configuration for the LTM, wherein the TCI state is configured for beam-only-switching. At block 730, the DU 130 transmits, to a terminal device, a first switching command for beam switching and a second switching command for configuration switching.

In some embodiments, the DU 130 further reserves a soft switching resource at the same location of the soft switching reference cell for the target cell. After receiving a beam switching message, the DU 130 further performs transmission to the terminal device or reception from the terminal device using the soft switching resource associated with the beam-only-switching for the LTM.

In some embodiments, the response further includes a reference signal (RS) configuration associated with the beam for the target cell. The DU 130 further receives, from the terminal device, a layer 1 (L1) measurement report generated by the terminal device based on the RS configuration transmitted from the first network device.

In some embodiments, the first switching command is transmitted by the second network device based on the L1 measurement report in the case the target cell is in a LTM cell group for soft switching.

In some embodiments, the second switching command is a LTM switching command without the TCI state. After transmitting the LTM switching command without the TCI state, the DU 130 further performs transmission to the terminal device or reception from the terminal device using a target cell resource associated with the target cell configuration.

In some embodiments, the first switching command includes a flag indicating delayed configuration switching along with a delay value.

In some embodiments, the configuration switching is performed based on expiry of the delay value.

In some embodiments, after transmitting the first switching command, the DU 130 further transmits, to the terminal device, a timer extension command for delaying the second switching.

In some embodiments, the second switching command is transmitted by the second network device based on completion of the transmission or the reception via the soft switching resource.

In some embodiments, after transmitting the first switching command, the DU 130 further transmits, to the terminal device, a switching deny command for cancelling the second switching.

In some embodiments, the DU 130 further receives a LTM complete message from the terminal device, and releases the soft switching resource.

In some embodiments, the first network device is a central unit of a base station. The second network device is a distributed unit of a base station.

Figure 8:
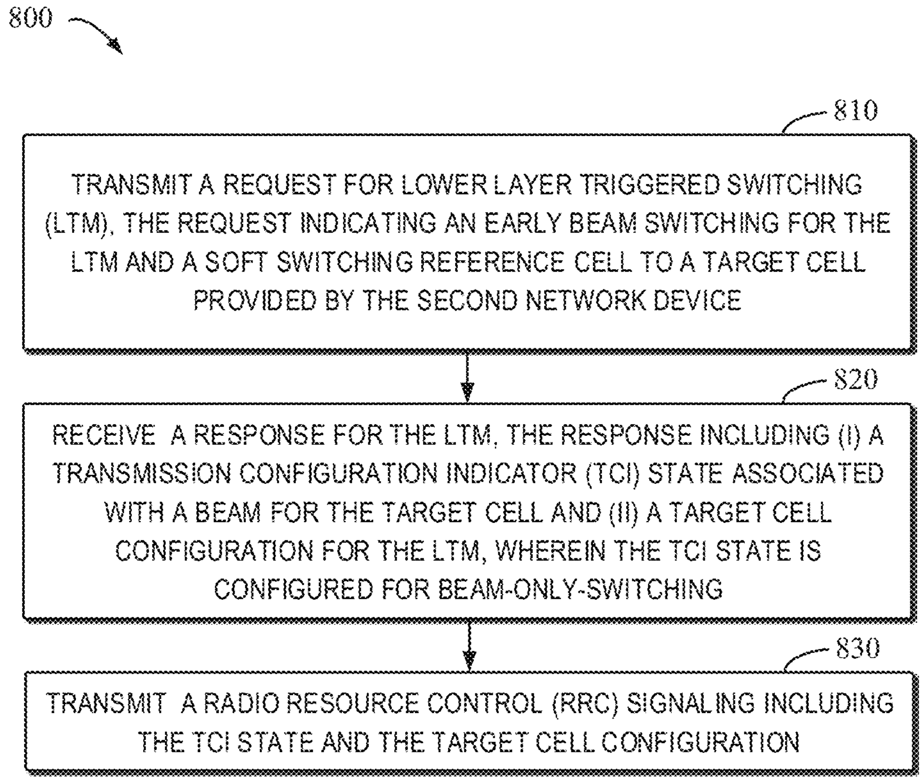
FIG. 8 illustrates a flowchart of a method implemented at another network device according to some embodiments of the present disclosure.

FIG. 8 shows a flowchart of an example method 800 implemented at a first network device in accordance with some embodiments of the present disclosure. For the purpose of discussion, the method 800 will be described from the perspective of the CU 120 with reference to FIG. 1.

At block 810, the CU 120 transmits, to a second network device, a request for lower layer triggered switching (LTM), the request indicating an early beam switching for the LTM and a soft switching reference cell to a target cell provided by the second network device. At block 820, the CU 120 receives, from the second network device, a response for the LTM, the response including (i) a transmission configuration indicator (TCI) state associated with a beam for the target cell and (ii) a target cell configuration for the LTM, wherein the TCI state is configured for beam-only-switching. At block 830, the CU 120 transmits, to a terminal device, a radio resource control (RRC) signaling including the TCI state and the target cell configuration.

In some embodiments, the first network device is a central unit of a base station. The second network device is a distributed unit of a base station.

In some embodiments, an apparatus capable of performing the method 600 (for example, the UE 110) may include means for performing the respective steps of the method 600. The means may be implemented in any suitable form. For example, the means may be implemented in a circuitry or software module.

In some embodiments, the apparatus includes: means for receiving, at a terminal device and from a first network device, a radio resource control (RRC) signaling including (i) a transmission configuration indicator (TCI) state associated with a beam for a target cell provided by a second network device and (ii) a target cell configuration for lower layer triggered switching (LTM), wherein the TCI state is configured for beam-only-switching; means for performing, based on the TCI state and a first switching command from the second network device, first switching from a beam for a source cell provided by the second network device to the beam for the target cell; and means for performing, based on the first switching command or a second switching command from the second network device, second switching from a source cell configuration to the target cell configuration.

In some embodiments, the apparatus further includes means for after performing the first switching, performing transmission to the second network device or reception from the second network device using a soft switching resource associated with the beam-only-switching for the LTM.

In some embodiments, the RRC signaling further includes a reference signal (RS) configuration associated with the beam for the target cell, and the apparatus further includes means for after receiving the RRC signaling, transmitting, to the second network device, a layer 1 (L1) measurement report generated based on the RS configuration.

In some embodiments, the RRC signaling further includes information of an LTM cell group for soft switching, and the first switching command is transmitted by the second network device based on the L1 measurement report in the case that the target cell is in the LTM cell group.

In some embodiments, the second switching command is a LTM switching command without the TCI state, and the apparatus further includes means for after receiving the LTM switching command without the TCI state, performing transmission to the second network device or reception from the second network device using a target cell resource associated with the target cell configuration.

In some embodiments, the first switching command includes a flag indicating delayed configuration switching along with a delay value.

In some embodiments, the second switching is performed based on expiry of the delay value.

In some embodiments, the apparatus further includes means for prior to receiving the second switching command, receiving, from the second network device, a timer extension command for delaying the second switching.

In some embodiments, the second switching command is transmitted by the second network device based on completion of the transmission or the reception via the soft switching resource.

In some embodiments, the apparatus further includes means for prior to receiving the second switching command, receiving, from the second network device, a switching deny command for cancelling the second switching.

In some embodiments, the apparatus further includes means for after performing the second switching, transmitting a LTM complete message to the second network device; and means for releasing the soft switching resource.

In some embodiments, the first network device is a central unit of a base station, and the second network device is a distributed unit of a base station.

In some embodiments, the apparatus further includes means for performing other steps in some embodiments of the method 600. In some embodiments, the means includes at least one processor and at least one memory including computer program code, the at least one memory and computer program code configured to, with the at least one processor, cause the performance of the apparatus.

In some embodiments, an apparatus capable of performing the method 700 (for example, the DU 130) may include means for performing the respective steps of the method 700. The means may be implemented in any suitable form. For example, the means may be implemented in a circuitry or software module.

In some embodiments, the apparatus includes means for receiving, at a second network device and from a first network device, a request for lower layer triggered switching (LTM), the request indicating an early beam switching for the LTM and a soft switching reference cell to a target cell provided by the second network device; means for transmitting, to the first network device, a response for the LTM, the response including (i) a transmission configuration indicator (TCI) state associated with a beam for the target cell and (ii) a target cell configuration for the LTM, wherein the TCI state is configured for beam-only-switching; and means for transmitting, to a terminal device, a first switching command for beam switching and a second switching command for configuration switching.

In some embodiments, the apparatus further includes means for reserving a soft switching resource at the same location of the soft switching reference cell for the target cell; and means for after receiving a beam switching message, performing transmission to the terminal device or reception from the terminal device using the soft switching resource associated with the beam-only-switching for the LTM.

In some embodiments, the response further includes a reference signal (RS) configuration associated with the beam for the target cell. The apparatus further includes means for receiving, from the terminal device, a layer 1 (L1) measurement report generated by the terminal device based on the RS configuration transmitted from the first network device.

In some embodiments, the first switching command is transmitted by the second network device based on the L1 measurement report in the case the target cell is in a LTM cell group for soft switching.

In some embodiments, the second switching command is a LTM switching command without the TCI state. The apparatus further includes means for after transmitting the LTM switching command without the TCI state, performing transmission to the terminal device or reception from the terminal device using a target cell resource associated with the target cell configuration.

In some embodiments, the first switching command includes a flag indicating delayed configuration switching along with a delay value.

In some embodiments, the configuration switching is performed based on expiry of the delay value.

In some embodiments, the apparatus further includes means for after transmitting the first switching command, transmitting, to the terminal device, a timer extension command for delaying the second switching.

In some embodiments, the second switching command is transmitted by the second network device based on completion of the transmission or the reception via the soft switching resource.

In some embodiments, the apparatus further includes means for after transmitting the first switching command, transmitting, to the terminal device, a switching deny command for cancelling the second switching.

In some embodiments, the apparatus further includes means for receiving a LTM complete message from the terminal device; and means for releasing the soft switching resource.

In some embodiments, the apparatus further includes means for performing other steps in some embodiments of the method 700. In some embodiments, the means includes at least one processor and at least one memory including computer program code, the at least one memory and computer program code configured to, with the at least one processor, cause the performance of the apparatus.

In some embodiments, an apparatus capable of performing the method 800 (for example, the CU 120) may include means for performing the respective steps of the method 800. The means may be implemented in any suitable form. For example, the means may be implemented in a circuitry or software module.

In some embodiments, the apparatus includes: means for transmitting, at a first network device and to a second network device, a request for lower layer triggered switching (LTM), the request indicating an early beam switching for the LTM and a soft switching reference cell to a target cell provided by the second network device; means for receiving, from the second network device, a response for the LTM, the response including (i) a transmission configuration indicator (TCI) state associated with a beam for the target cell and (ii) a target cell configuration for the LTM, wherein the TCI state is configured for beam-only-switching; and means for transmitting, to a terminal device, a radio resource control (RRC) signaling including the TCI state and the target cell configuration.

In some embodiments, the first network device is a central unit of a base station, and the second network device is a distributed unit of a base station.

In some embodiments, the apparatus further includes means for performing other steps in some embodiments of the method 800. In some embodiments, the means includes at least one processor and at least one memory including computer program code, the at least one memory and computer program code configured to, with the at least one processor, cause the performance of the apparatus.

Figure 9:
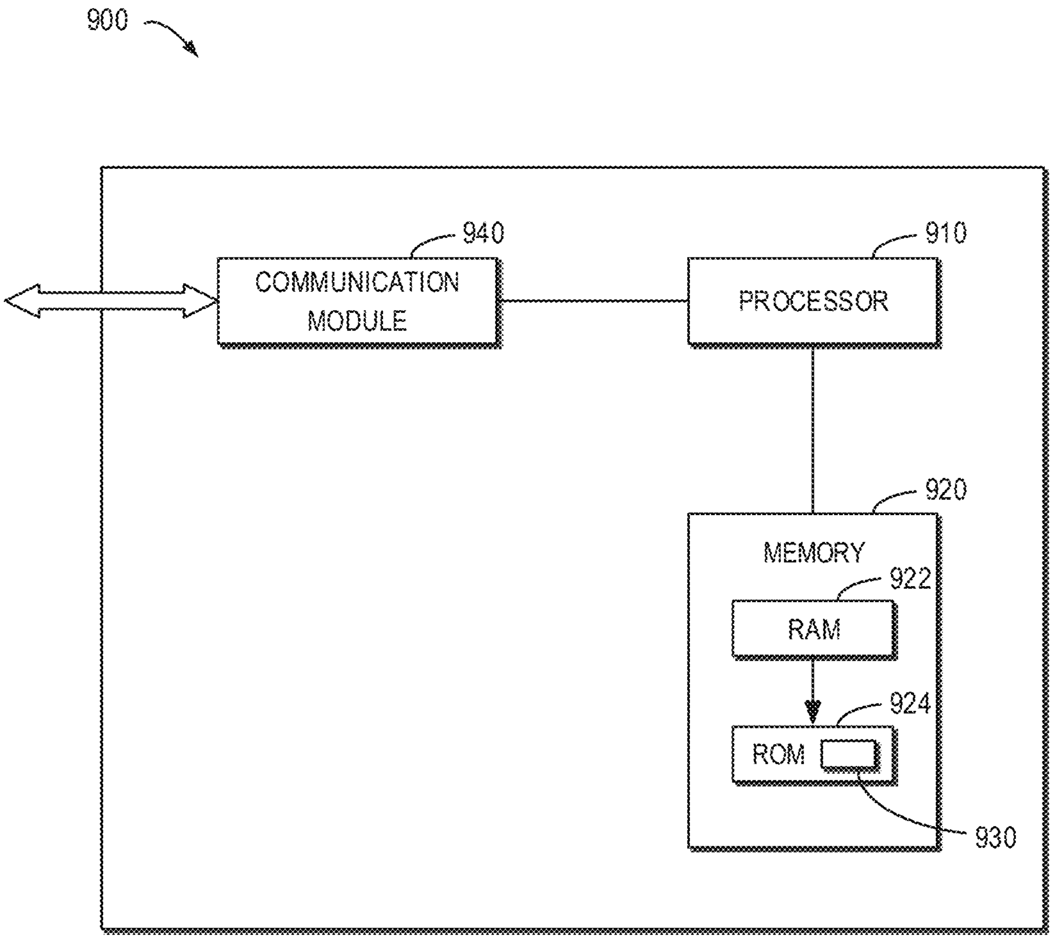
FIG. 9 illustrates a simplified block diagram of a device that is suitable for implementing embodiments of the present disclosure.

FIG. 9 is a simplified block diagram of a device 900 that is suitable for implementing embodiments of the present disclosure. The device 900 may be provided to implement the communication device, for example the UE 110, the CU 120 or the DU 130 as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication modules 940 have at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 1020. The processor 910 may perform any suitable actions and processing by loading the program 930 into the RAM 922.

The embodiments of the present disclosure may be implemented by means of the program 930 so that the device 900 may perform any process of the disclosure as discussed with reference to FIGS. 2 to 5. The embodiments of the present disclosure may also be implemented by hardware or by a combination of software and hardware.

Figure 10:
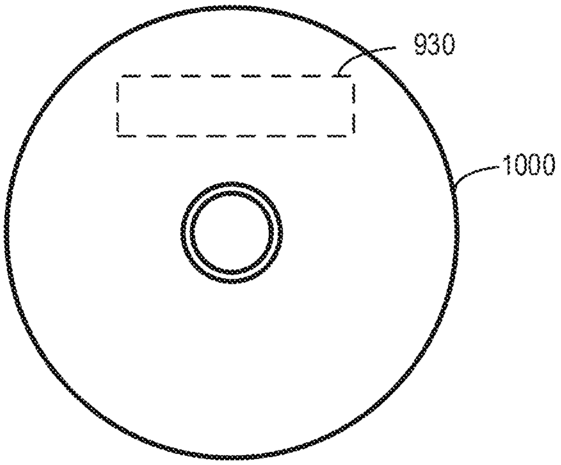
FIG. 10 illustrates a block diagram of an example computer readable medium in accordance with some embodiments of the present disclosure.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

We claim:

1. A terminal device comprising:

at least one processor; and at least one memory storing instructions that, when executed by the at least one processor, cause the terminal device at least to:

receive, from a first network device, a radio resource control (RRC) signaling including (i) a transmission configuration indicator (TCI) state associated with a beam for a target cell provided by a second network device and (ii) a target cell configuration for lower layer triggered switching (LTM), wherein the TCI state is configured for beam-only-switching;

perform, based on the TCI state and a first switching command from the second network device, first switching from a beam for a source cell provided by the second network device to the beam for the target cell; and perform, based on the first switching command or a second switching command from the second network device, second switching from a source cell configuration to the target cell configuration.

2. The terminal device of claim 1, wherein the terminal device is further caused to:

after performing the first switching, perform transmission to the second network device or reception from the second network device using a soft switching resource associated with the beam-only-switching for the LTM.

3. The terminal device of claim 1, wherein the RRC signaling further includes a reference signal (RS) configuration associated with the beam for the target cell, and the terminal device is further caused to:

after receiving the RRC signaling, transmit, to the second network device, a layer 1 (L1) measurement report generated based on the RS configuration.

4. The terminal device of claim 3, wherein the RRC signaling further includes information of an LTM cell group for soft switching, and the first switching command is transmitted by the second network device based on the L1 measurement report in the case that the target cell is in the LTM cell group.

5. The terminal device of claim 1, wherein the second switching command is a LTM switching command without the TCI state, and the terminal device is further caused to:

after receiving the LTM switching command without the TCI state, perform transmission to the second network device or reception from the second network device using a target cell resource associated with the target cell configuration.

6. The terminal device of claim 1, wherein the first switching command includes a flag indicating delayed configuration switching along with a delay value.

7. The terminal device of claim 6, wherein the second switching is performed based on expiry of the delay value.

8. The terminal device of claim 6, wherein the terminal device is further caused to:

prior to receiving the second switching command, receive, from the second network device, a timer extension command for delaying the second switching.

9. The terminal device of claim 6, wherein the second switching command is transmitted by the second network device based on completion of the transmission or the reception via the soft switching resource.

10. The terminal device of claim 1, wherein the terminal device is further caused to:

prior to receiving the second switching command, receive, from the second network device, a switching deny command for cancelling the second switching.

11. The terminal device of claim 1, wherein the terminal device is further caused to:

after performing the second switching, transmit a LTM complete message to the second network device; and release the soft switching resource.

12. The terminal device of claim 1, wherein:

the first network device is a central unit of a base station; and the second network device is a distributed unit of a base station.

13. A second network device comprising:

at least one processor; and at least one memory storing instructions that, when executed by the at least one processor, cause the second network device at least to:

receive, from a first network device, a request for lower layer triggered switching (LTM), the request indicating an early beam switching for the LTM and a soft switching reference cell to a target cell provided by the second network device;

transmit, to the first network device, a response for the LTM, the response including (i) a transmission configuration indicator (TCI) state associated with a beam for the target cell and (ii) a target cell configuration for the LTM, wherein the TCI state is configured for beam-only-switching; and transmit, to a terminal device, a first switching command for beam switching and a second switching command for configuration switching.

14. The second network device of claim 13, wherein the second network device is further caused to:

reserve a soft switching resource at the same location of the soft switching reference cell for the target cell; and after receiving a beam switching message, perform transmission to the terminal device or reception from the terminal device using the soft switching resource associated with the beam-only-switching for the LTM.

15. The second network device of claim 13, wherein the response further includes a reference signal (RS) configuration associated with the beam for the target cell, and the second network device is further caused to:

receive, from the terminal device, a layer 1 (L1) measurement report generated by the terminal device based on the RS configuration transmitted from the first network device.

16. The second network device of claim 15, wherein the first switching command is transmitted by the second network device based on the L1 measurement report in the case the target cell is in a LTM cell group for soft switching.

17. The second network device of claim 13, wherein the second switching command is a LTM switching command without the TCI state, and the second network device is further caused to:

after transmitting the LTM switching command without the TCI state, perform transmission to the terminal device or reception from the terminal device using a target cell resource associated with the target cell configuration.

18. The second network device of claim 13, wherein the first switching command includes a flag indicating delayed configuration switching along with a delay value.

19. The second network device of claim 18, wherein the configuration switching is performed based on expiry of the delay value.

20. A first network device comprising:

at least one processor; and at least one memory storing instructions that, when executed by the at least one processor, cause the first network device at least to:

transmit, to a second network device, a request for lower layer triggered switching (LTM), the request indicating an early beam switching for the LTM and a soft switching reference cell to a target cell provided by the second network device;

receive, from the second network device, a response for the LTM, the response including (i) a transmission configuration indicator (TCI) state associated with a beam for the target cell and (ii) a target cell configuration for the LTM, wherein the TCI state is configured for beam-only-switching; and transmit, to a terminal device, a radio resource control (RRC) signaling including the TCI state and the target cell configuration.

* * * * *